United States Patent
Nagle et al.

(10) Patent No.: US 9,849,969 B2
(45) Date of Patent: Dec. 26, 2017

(54) LIGHTWEIGHT PROPELLER BLADE WITH IMPROVED RETENTION CAPACITY

(71) Applicant: Hamilton Sundstrand Corporation, Windsor Locks, CT (US)

(72) Inventors: David P. Nagle, Westfield, MA (US); Stephen L. Smith, West Suffield, CT (US)

(73) Assignee: HAMILTON SUNSTRAND CORPORATION, Windsor Locks, CT (US)

( * ) Notice: Subject to any disclaimer, the term of this patent is extended or adjusted under 35 U.S.C. 154(b) by 334 days.

(21) Appl. No.: 14/663,941

(22) Filed: Mar. 20, 2015

(65) Prior Publication Data

US 2016/0272299 A1    Sep. 22, 2016

(51) Int. Cl.
  *B64C 11/04*    (2006.01)
  *B64C 11/26*    (2006.01)
  (Continued)

(52) U.S. Cl.
  CPC ............. *B64C 11/26* (2013.01); *B64C 11/06* (2013.01); *B64C 2027/4736* (2013.01)

(58) Field of Classification Search
  CPC . B64C 11/26; B64C 11/06; B64C 2027/4736; B64C 11/04; B64C 27/473;
  (Continued)

(56) References Cited

U.S. PATENT DOCUMENTS

| 1,437,099 A | 11/1922 | Frederick |
| 2,017,505 A * | 10/1935 | Meon ...................... B64C 11/06 416/147 |

(Continued)

FOREIGN PATENT DOCUMENTS

| DE | 352425 C | 4/1922 |
| EP | 1024081 A2 | 8/2000 |

(Continued)

OTHER PUBLICATIONS

European Search Report and Communication; Application No. 16161258; dated Jul. 19, 2016; 8 pages.

*Primary Examiner* — Gregory Anderson
*Assistant Examiner* — Eldon Brockman
(74) *Attorney, Agent, or Firm* — Cantor Colburn LLP

(57) ABSTRACT

A propeller blade assembly includes a spar extending along a propeller blade axis and an outer sleeve surrounding the spar portion at a root end of the rotor blade assembly. The spar is adhesively bonded to the outer sleeve at an interface portion. A spar maximum diameter along the interface portion is larger than an outer sleeve minimum diameter along the interface portion. A method of assembling a propeller blade includes installing an outer sleeve over a spar at a root end of the spar, the spar a not fully cured composite component, and urging the spar into compressive conformance with the outer sleeve at an interface portion of the propeller blade assembly. A spar maximum diameter along the interface portion is larger than an outer sleeve minimum diameter along the interface portion. The spar is cured thereby adhesively bonding the spar to the outer sleeve at the interface portion.

13 Claims, 8 Drawing Sheets

(51) Int. Cl.
*B64C 11/06* (2006.01)
*B64C 27/473* (2006.01)

(58) Field of Classification Search
CPC ......... B64C 27/48; B64C 11/20; B64C 11/24; F01D 5/147; F01D 5/30; B29D 99/0025; B29D 99/0028; F04D 29/34; F04D 29/023; F04D 29/36; F05D 2230/23
See application file for complete search history.

(56) References Cited

U.S. PATENT DOCUMENTS

| | | | | |
|---|---|---|---|---|
| 2,240,873 | A * | 5/1941 | Thomas | B64C 11/04 |
| | | | | 416/134 R |
| 2,482,217 | A * | 9/1949 | Sacchini | B64C 11/06 |
| | | | | 416/156 |
| 3,303,889 | A | 2/1967 | Bates | |
| 4,031,601 | A | 6/1977 | Staub et al. | |
| 4,302,155 | A * | 11/1981 | Grimes | B64C 11/26 |
| | | | | 416/144 |
| 4,524,499 | A * | 6/1985 | Grimes | B64C 11/26 |
| | | | | 29/450 |
| 6,213,719 | B1 * | 4/2001 | Violette | B64C 11/06 |
| | | | | 416/204 A |
| 6,443,701 | B1 * | 9/2002 | Muhlbauer | B64C 11/06 |
| | | | | 416/230 |
| 8,075,280 | B2 * | 12/2011 | Jones | F04D 29/023 |
| | | | | 29/889.7 |
| 2002/0008177 | A1 | 1/2002 | Violette | |
| 2003/0156944 | A1 | 8/2003 | Rust | |
| 2014/0314577 | A1 * | 10/2014 | Udall | B64C 11/04 |
| | | | | 416/220 R |

FOREIGN PATENT DOCUMENTS

| | | | | |
|---|---|---|---|---|
| EP | 2796367 A1 | 10/2014 | | |
| GB | 251908 A | * 5/1926 | ............. | B64C 11/04 |
| GB | 2226604 A | 7/1990 | | |

* cited by examiner

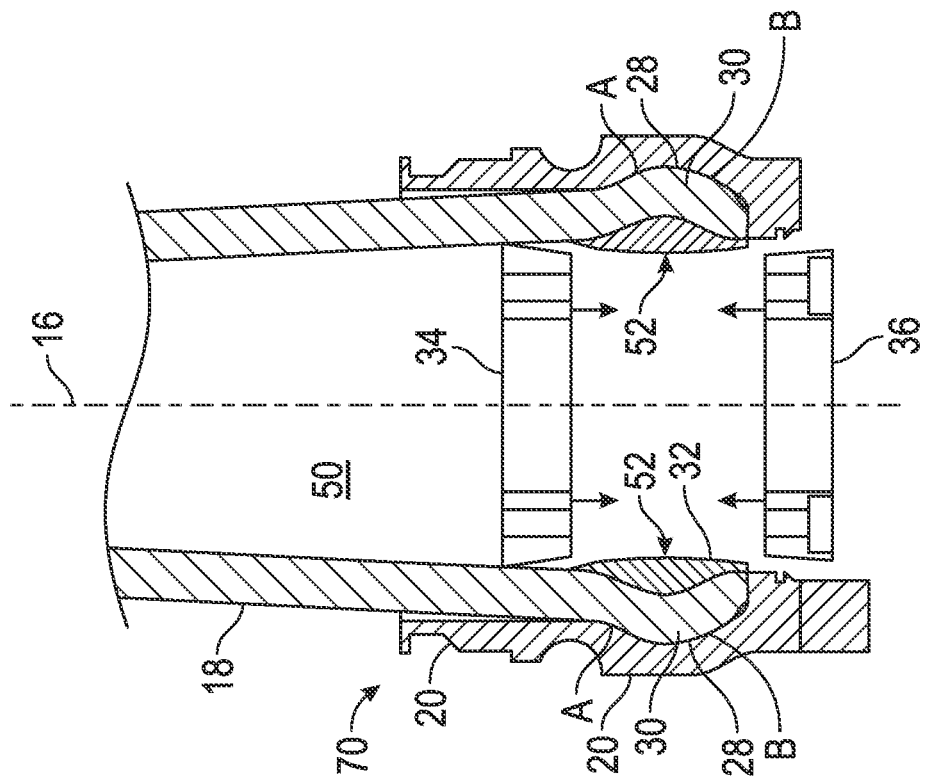
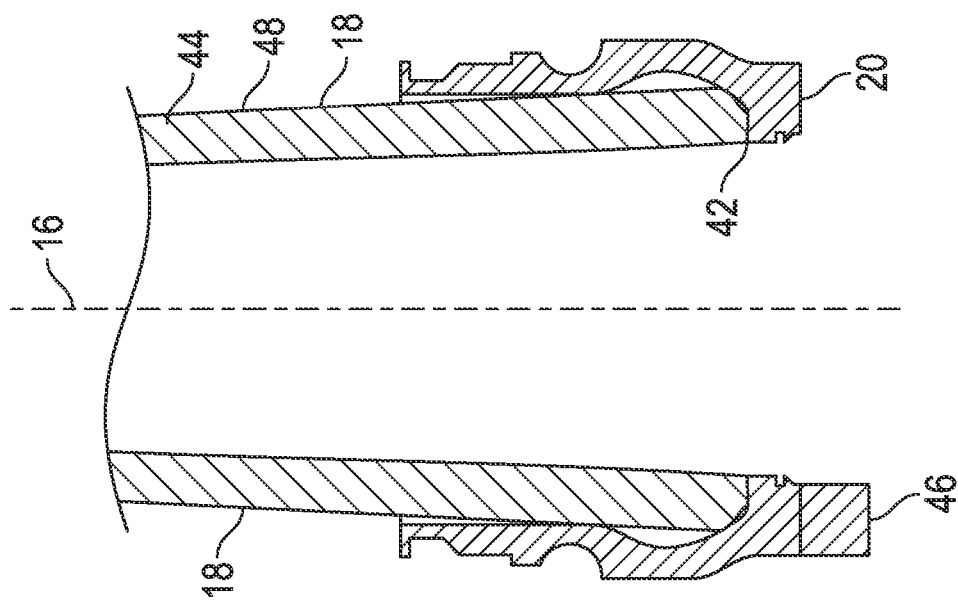

LIGHTWEIGHT PROPELLER BLADE WITH IMPROVED RETENTION CAPACITY

BACKGROUND

The subject matter disclosed herein generally relates to propellers for fixed wing aircraft, rotary wing aircraft and the like. More specifically, the present disclosure relates to lightweight propeller blade construction.

Modern propeller blades typically incorporate composite materials to reduce weight and enhance performance. However, the inboard portion of the blade, called the retention member 104, is typically made of steel. Shown in FIG. 11 is an example of a present composite propeller blade 100. The blade 100 includes an outer portion or spar 102 formed of lightweight composite materials. A retention member 104 is formed from a metal, such as steel, aluminum, or titanium, and includes features to interact with bearings 106 at a propeller hub 108. The bearings 106 react the blade centrifugal and bending loads, while allowing the blade 100 to change pitch. The steel retention member 104 is rather long to accommodate a bond joint 110 with the spar 102, at which the retention member 104 extends inside of the spar 102, and is secured to the spar 102. Due to the features described above, the weight of the steel retention member 104 can be about ⅓ the total blade weight.

BRIEF SUMMARY

In one embodiment, a propeller blade assembly includes a spar extending along a propeller blade axis and an outer sleeve surrounding the spar portion at a root end of the rotor blade assembly. The spar is adhesively bonded to the outer sleeve at an interface portion and a spar maximum diameter along the interface portion is larger than an outer sleeve minimum diameter along the interface portion.

Additionally or alternatively, in this or other embodiments an inner ring is located in a spar cavity and a wedge is positioned inside of the inner ring. Installation of the wedge urges the inner ring into contact with the spar, thus urging the spar into conformal compressive contact with the outer sleeve at the interface portion.

Additionally or alternatively, in this or other embodiments the inner ring is segmented.

Additionally or alternatively, in this or other embodiments the wedge is an inboard wedge and an outboard wedge, relative to the propeller blade axis. The inboard wedge is secured to the outboard wedge via one or more bolts.

Additionally or alternatively, in this or other embodiments an outer surface of the outer sleeve is configured to interface with one or more bearing rows.

Additionally or alternatively, in this or other embodiments the interface portion is defined by a convex surface of the spar and a complimentary concave surface of the outer sleeve.

Additionally or alternatively, in this or other embodiments the interface portion is defined by a concave surface of the spar and a complimentary convex surface of the outer sleeve.

Additionally or alternatively, in this or other embodiments the spar is formed from a composite material and the outer sleeve is formed from a metal material.

In another embodiment, a method of assembling a propeller blade includes installing an outer sleeve over a spar at a root end of the spar, the spar a not fully cured composite component, and urging the spar into compressive conformance with the outer sleeve at an interface portion of the propeller blade assembly. A spar maximum diameter along the interface portion is larger than an outer sleeve minimum diameter along the interface portion. The spar is cured thereby adhesively bonding the spar to the outer sleeve at the interface portion.

Additionally or alternatively, in this or other embodiments urging the spar into compressive conformance with the outer sleeve at the interface portion includes installing an inner ring in a spar cavity and installing a wedge assembly inside of the inner ring. Installation of the wedge assembly urges the inner ring into contact with the spar, thus urging the spar into conformal compressive contact with the outer sleeve at the interface portion.

Additionally or alternatively, in this or other embodiments installation of the wedge results in expansion of the inner ring into contact with the spar.

Additionally or alternatively, in this or other embodiments the wedge is an inboard wedge and an outboard wedge, relative to the propeller blade axis. The inboard wedge is tightened to the outboard wedge via one or more bolts and the tightening of the inboard wedge to the outboard wedge urges the inner ring into contact with the spar.

Additionally or alternatively, in this or other embodiments the interface portion of the spar is preformed prior to installing the outer sleeve over the spar.

Additionally or alternatively, in this or other embodiments the interface portion is defined by a convex surface of the spar and a complimentary concave surface of the outer sleeve.

Additionally or alternatively, in this or other embodiments the interface portion is defined by a concave surface of the spar and a complimentary convex surface of the outer sleeve.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 3 illustrates a portion of an exemplary assembly method of an embodiment of a propeller blade assembly;

FIG. 4 illustrates another portion of an exemplary assembly method of an embodiment of a propeller blade assembly;

The detailed description explains embodiments of the invention, together with advantages and features, by way of example with reference to the drawings.

DETAILED DESCRIPTION

Figure 1:
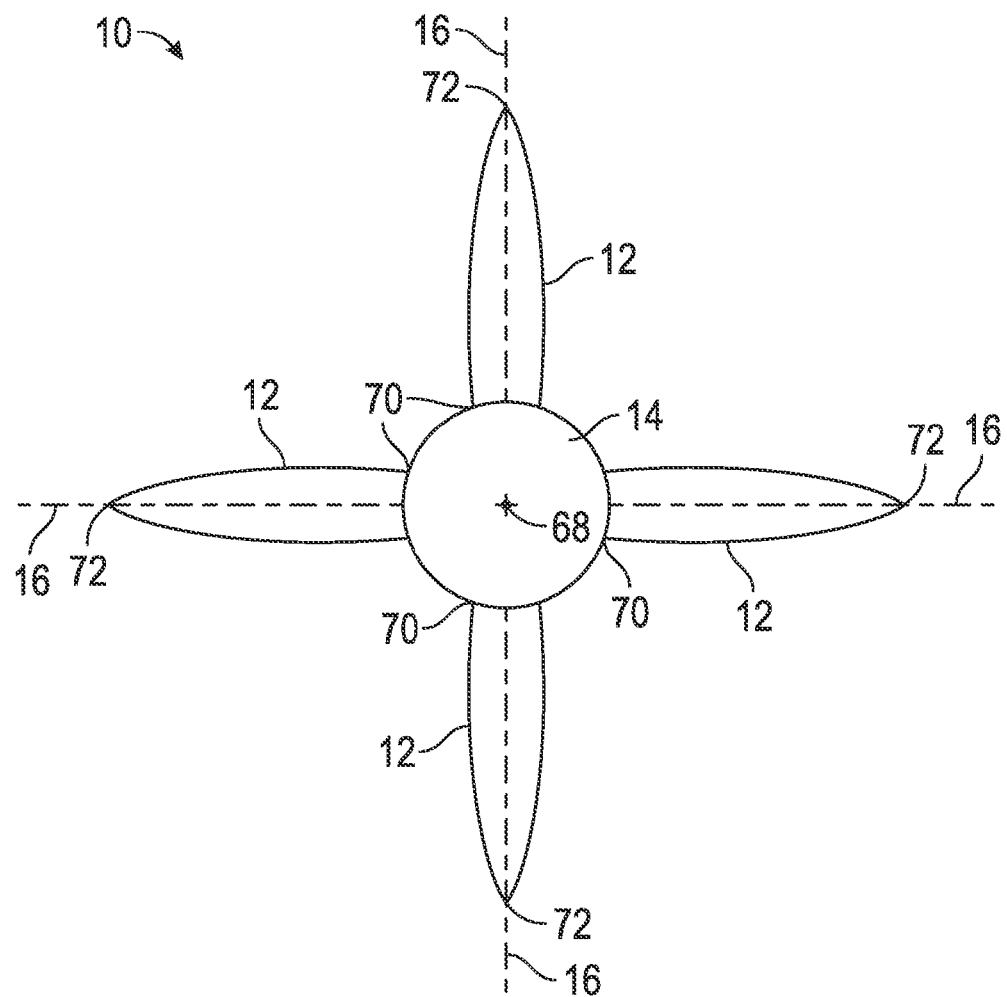
FIG. 1 is a plan view of an embodiment of a propeller assembly.

FIG. 1 illustrates a propeller assembly 10 of, for example, an aircraft such as a fixed wing aircraft or a rotary wing aircraft. Although a configuration is illustrated and described in the disclosed non-limiting embodiment, other configurations and/or machines with propeller or rotor systems are within the scope of the present invention. Further, one skilled in the art will readily appreciate that the present disclosure may be utilized in other, non-aircraft applications. The propeller assembly 10 includes a plurality of propeller blades 12 secured at a propeller hub 14. Each propeller blade 12 has a root end 70 closest to the propeller hub 14 and a tip end 72 furthest from the propeller hub 14. The propeller hub 14 rotates about a propeller hub axis 68. The propeller blades 12 are retained at the propeller hub 14 by one or more sets or rows of bearings 26 (see FIG. 2) that are configured to react propeller blade 12 centrifugal and bending loads, while allowing the propeller blade 12 to change pitch about a propeller blade axis 16.

Figure 2:
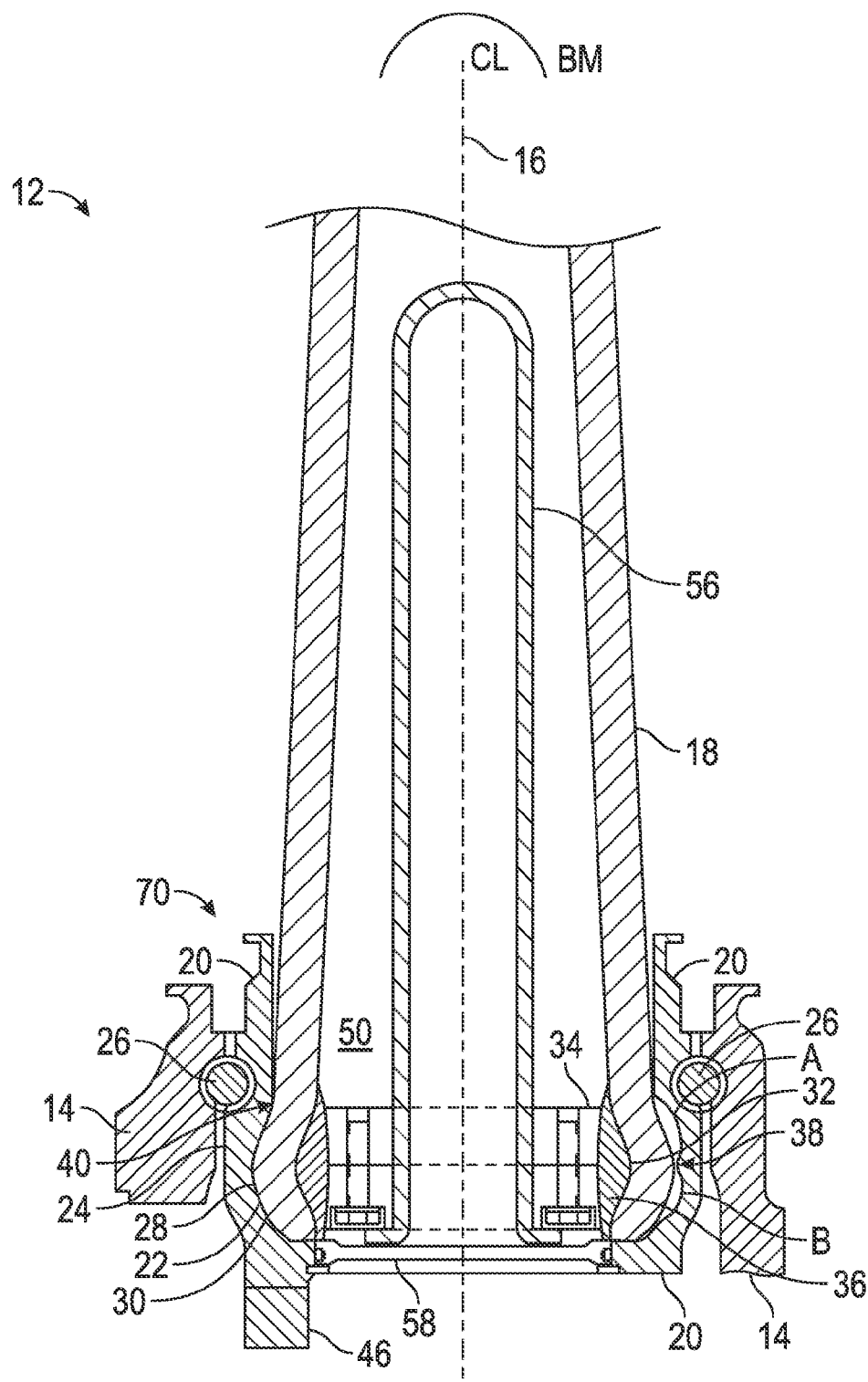
FIG. 2 is a cross-sectional view of an embodiment of a propeller blade assembly and attachment to a propeller hub.

Referring now to FIG. 2, an exemplary embodiment of the propeller blade 12 is illustrated. The propeller blade 12 includes a radially outboard portion, or spar 18, formed from a composite material, such as graphite or carbon fiber or the like. It is to be noted that, as utilized in the present application, the terms "inboard" and "outboard" denote position relative to, or relative distance from, the propeller hub axis 68, while the terms "inner" and "outer" denote position relative to, or relative distance from the propeller blade axis 16. The spar 18 is insertable into, and is secured to, a radially inboard retention member, or outer sleeve 20. The outer sleeve 20 is formed from a steel or other metallic material, and in some embodiments includes a trunion pin 46. The outer sleeve 20 is secured to the spar 18 at a sleeve inner surface 22, while a sleeve outer surface 24 is configured to interact with the bearings 26. The bearings 26 are arranged in bearing rows and support the propeller blade 12 at the propeller hub 14. While a single row of bearings 26 is shown in FIG. 2, it is to be appreciated that the present disclosure may be readily applied to propeller blades retained by two or more rows of bearings.

The sleeve inner surface 22 includes a concave sleeve portion 28 at which a convex spar portion 30 of the spar 18 is located and retained via adhesive. To urge the convex spar portion 30 into contact with the concave sleeve portion 28, the propeller blade 12 includes a segmented inner ring 32 installed inside of the spar 18, which is urged outwardly into contact with the spar 18 by an outboard wedge 34 and an inboard wedge 36. The segmented inner ring 32 is formed by a plurality of inner ring segments extending partially around the propeller blade axis 16. When the outboard wedge 34 and inboard wedge 36 are installed, the segmented inner ring 32 is expanded, thus urging the convex spar portion 30 into contact with the concave sleeve portion 28.

The spar 18 transmits the blade loads to the outer sleeve 20 along the adhesive interfaces defined as areas A and B in FIG. 2, of the concave sleeve portion 28. The spar 18 is also mechanically locked to the outer sleeve 20 along the concave sleeve portion 28 due to the fact that a spar maximum diameter 38 is larger than an outer sleeve minimum diameter 40.

One challenge for lightweight propeller blades is that the bending moment (BM) capacity of the retention is often reduced due to the lower centrifugal load (CL). The bearings 26 can be sized to withstand high bending moments, but the interface between the spar 18 and outer sleeve 20 may become unloaded due to insufficient centrifugal loading. The blade CL is transmitted through the adhesive interface between the spar 18 and outer sleeve 20 at area A. The through-thickness adhesive stresses are compressive. This is desirable because adhesive compressive strength is considerably higher than tensile. The BM reduces the compressive stresses at area A. The propeller blade 12 improves the BM capacity because the shape of interface between the spar 18 and the outer sleeve 20 prevents the load at area A from going into tension. In particular, this is accomplished by providing a secondary load path at area B when the BM is very high. In this case, the adhesive interface at area B is subjected to compressive stresses.

Figure 5:
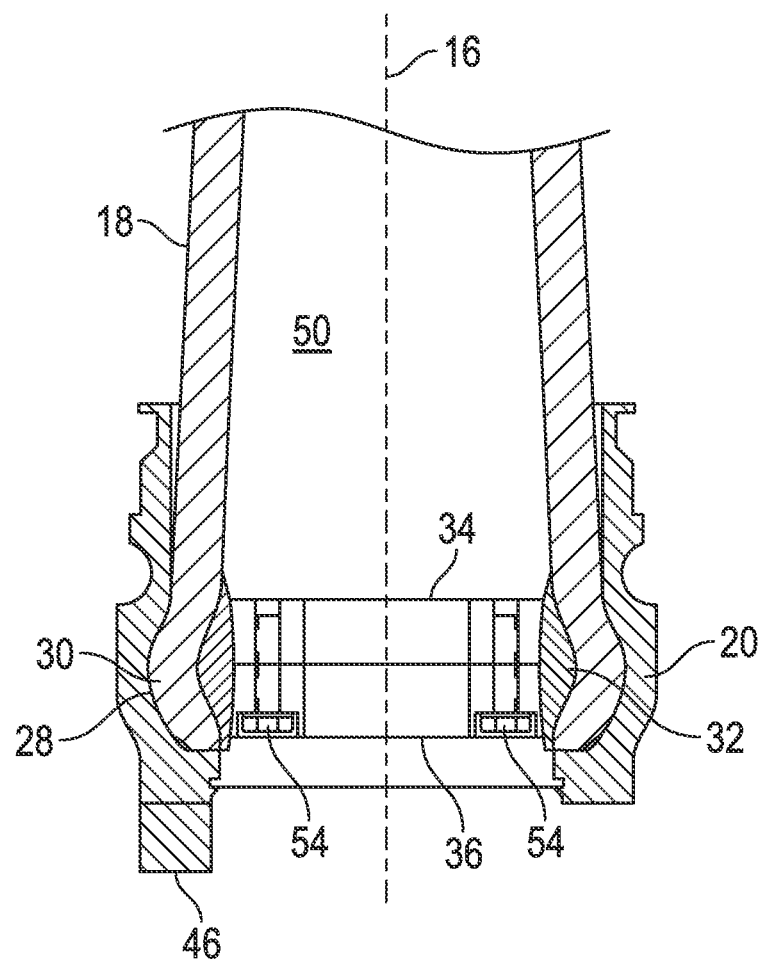
FIG. 5 illustrates yet another portion of an exemplary assembly method of an embodiment of a propeller blade assembly.

A method for assembly of the propeller blade assembly 12 is illustrated in FIGS. 3-5. Referring to FIG. 3, the outer sleeve 20 is installed over an uncured or partially cured composite spar 18 from an inboard end 42 of the composite spar 18. Installing from the inboard end 42 is desirable, as opposed to installing the outer sleeve 20 from an outboard end 44 of the spar 18 as this method does not limit the spar 18 geometry outboard of the outer sleeve 20. An outer surface 48 of the uncured spar 18 may be substantially straight when the outer sleeve 20 is installed thereon, as shown in FIG. 3. In other embodiments, the convex spar portion 30 may be formed prior to installation of the outer sleeve 20 utilizing, for example, a wash out mandrel, foam or other material of the selected shape onto which the spar material is braided at the inboard end 42. The wash out mandrel or foam is then removed and the spar 18 may be collapsed so that the outer sleeve 20 will fit over the spar 18. Pre-forming the convex spar portion 30 in this manner helps ensure that the spar 18 has the desired braiding coverage necessary at the convex spar portion 30, as opposed to braiding the inboard end 42 in a straight configuration, and then merely expanding it to form the convex spar portion 30.

Referring to FIG. 4, the outboard wedge 34 is then inserted into a spar cavity 50, followed by the segmented inner ring 32. The inner ring 32 segments may be connected by, for example, pins or other connecting means to make handling and installation easier, while still allowing for expansion of the inner ring 32 and the spar 18. Next, an expanding tool, schematically shown as 52, is utilized to expand the segmented inner ring 32 forcing the uncured spar 18 to take the shape of the concave sleeve portion 28 and also puts the adhesive in areas A and B into compression. The expansion tool 52 is removed, and referring now to FIG. 5, the inboard wedge 36 is inserted into the spar cavity 50. Bolts 54 or other means are used to draw the outboard wedge 34 and inboard wedge 36 together, which expands the segmented inner ring 32 further, which in turn compresses the spar 18 and adhesive into contact with the outer ring 30 at the concave sleeve portion 28/convex spar portion 30 interface. The propeller blade 12 is then injected with resin and cured to achieve the selected shape. The segmented inner ring 32, the outboard wedge 34 and the inboard wedge 36 prevent collapse of the spar 18 when the CL and BM are applied to the propeller blade 12.

Referring again to FIG. 2, additional components such as a blade balance tube 56 aiding in achieving propeller assembly 10 balance and a bore plug 58 to prevent ingress of oil or other material into the spar cavity 50, may be installed at an inboard end 80 of the propeller blade 12.

Figure 6:
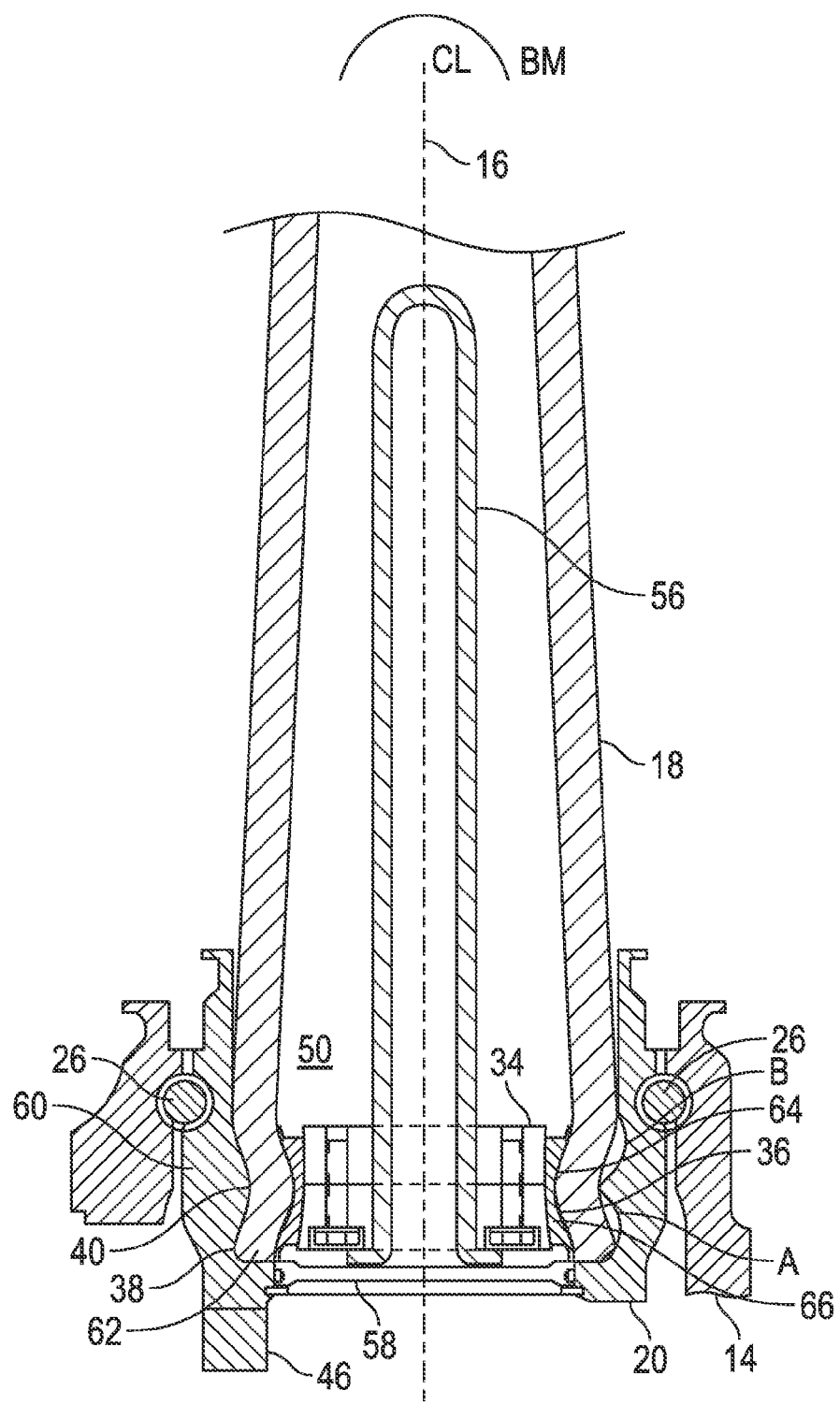
FIG. 6 illustrates a cross-sectional view of another embodiment of a propeller blade assembly and attachment to a propeller hub.

Referring now to FIG. 6, another exemplary embodiment of a propeller blade 12 is illustrated. In this embodiment, the sleeve inner surface 22 includes an convex sleeve portion 60 at which an concave spar portion 62 of the spar 18 is located and retained via adhesive. To urge the concave spar portion 62 into contact with the convex sleeve portion 60, the propeller blade 12 includes an outboard inner ring 64 and an inboard inner ring 66 installed inside of the spar 18, which are each urged outwardly into contact with the spar 18 by the outboard wedge 34 and the inboard wedge 36. The outboard inner ring 64 and the inboard inner ring 66 may be unitary or alternatively may be formed by a plurality of inner ring segments extending partially around the propeller blade axis 16. When the outboard wedge 34 and inboard wedge 36 are installed, the outboard inner ring 64 and the inboard inner ring 66 are expanded, thus urging the concave spar portion 62 into contact with the convex sleeve portion 60.

As with the embodiment of FIG. 2, the spar 18 transmits the blade loads to the outer sleeve 20 along the adhesive interfaces defined as areas A and B in FIG. 6, of the convex sleeve portion 60. The spar 18 is also mechanically locked to the outer sleeve 20 along the convex sleeve portion 60 due to the fact that the spar maximum diameter 38 is larger than the outer sleeve minimum diameter 40. The propeller blade 12 improves the BM capacity because the shape of interface between the spar 18 and the outer sleeve 20 prevents the load at area A from going into tension. In particular, this is accomplished by providing a secondary load path at area B when the BM is very high. In this case, the adhesive interface at area B is subjected to compressive stresses.

Figure 8:
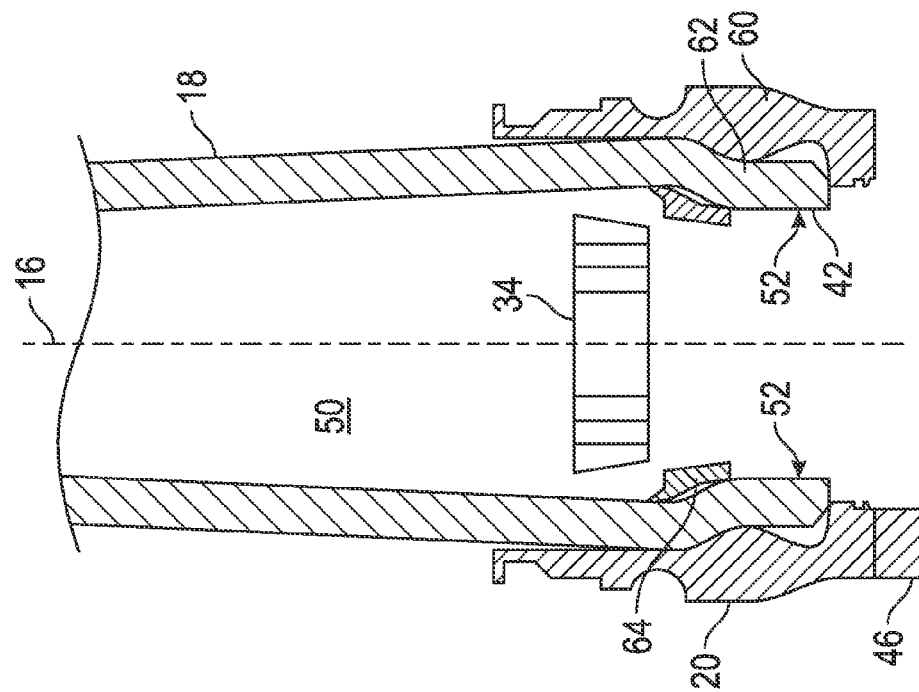
FIG. 8 illustrates another portion of an exemplary assembly method of an embodiment of a propeller blade assembly.
Figure 7:
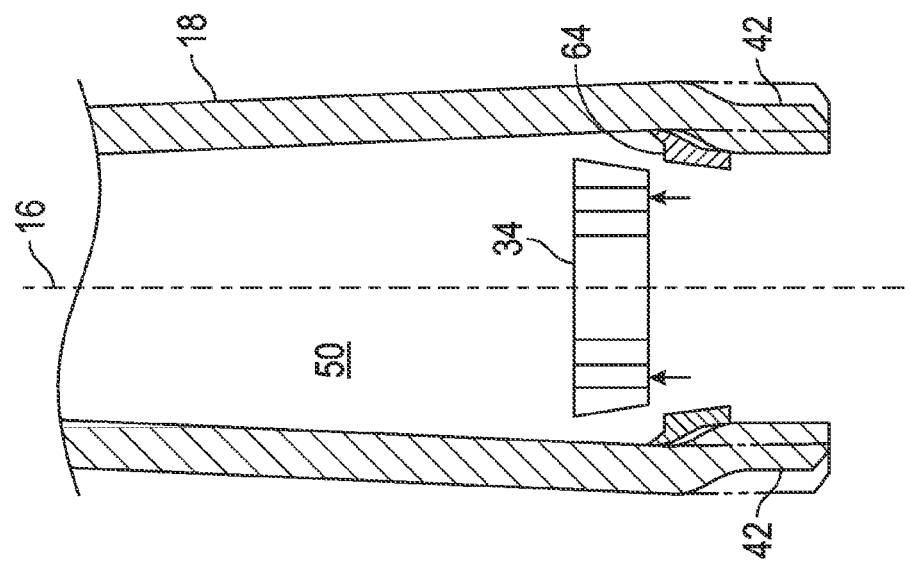
FIG. 7 illustrates a portion of an exemplary assembly method of an embodiment of a propeller blade assembly.

Another exemplary method for assembly of the propeller blade assembly 12 is illustrated in FIGS. 7-10. Referring to FIG. 7, the outboard wedge 34 is inserted into the spar cavity 50 followed by the outboard inner ring 64. A clamp or other tool is then used to compress the inboard end 42 of the uncured spar 18. Referring to FIG. 8, the outer sleeve 20 is then installed over the uncured spar 18 from the inboard end 42. The expansion tool 52 is then utilized to expand the uncured spar 18 to form the concave spar portion 62 which conforms with the convex sleeve portion 60. This expansion also puts the adhesive at areas A and B into compression.

Figure 9:
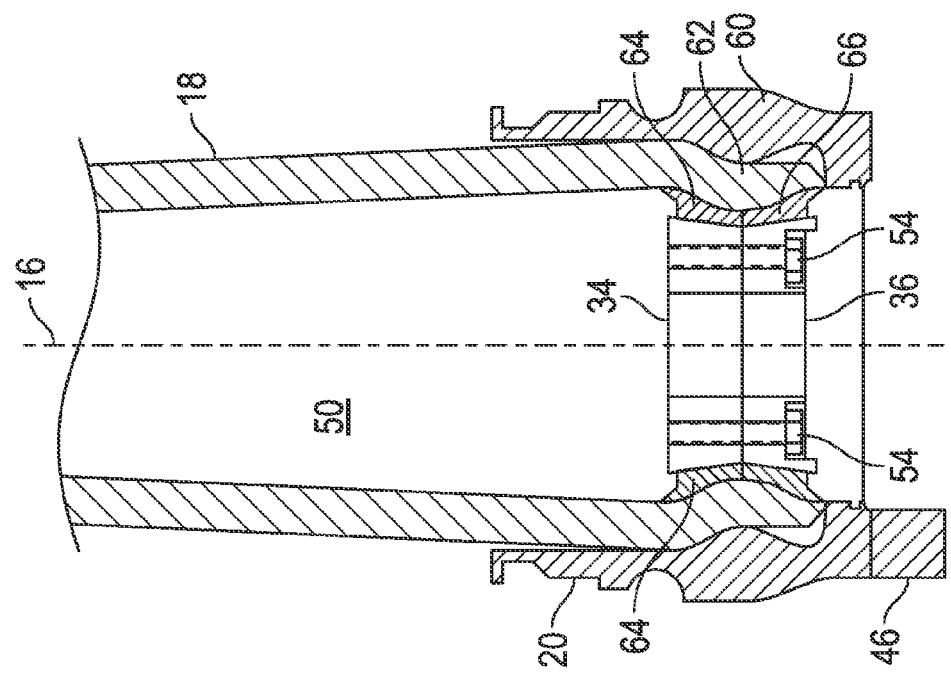
FIG. 9 illustrates yet another portion of an exemplary assembly method of an embodiment of a propeller blade assembly.
Figure 10:
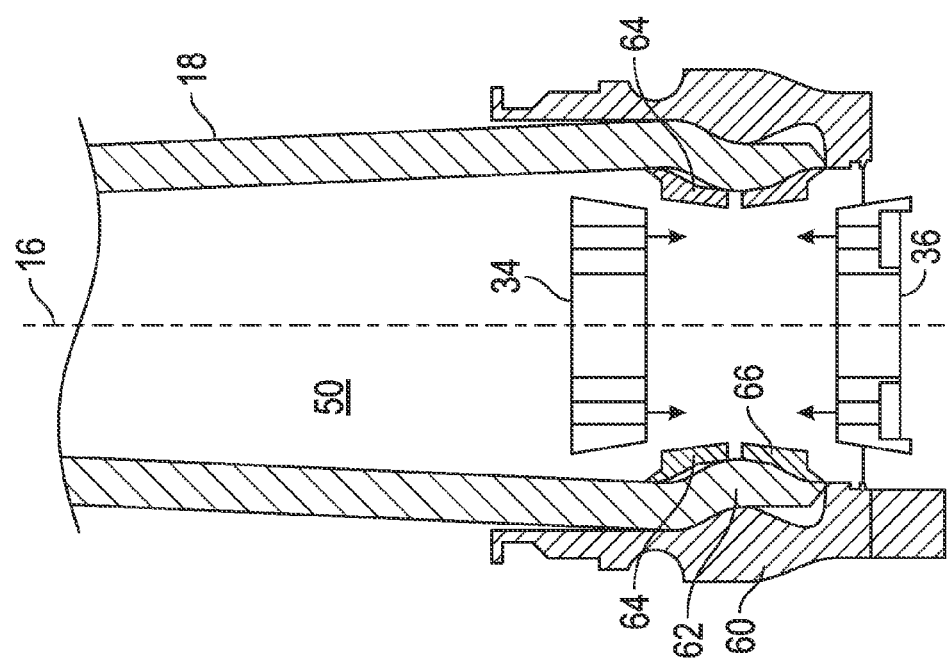
FIG. 10 illustrates still another portion of an exemplary assembly method of an embodiment of a propeller blade assembly.
Figure 11:
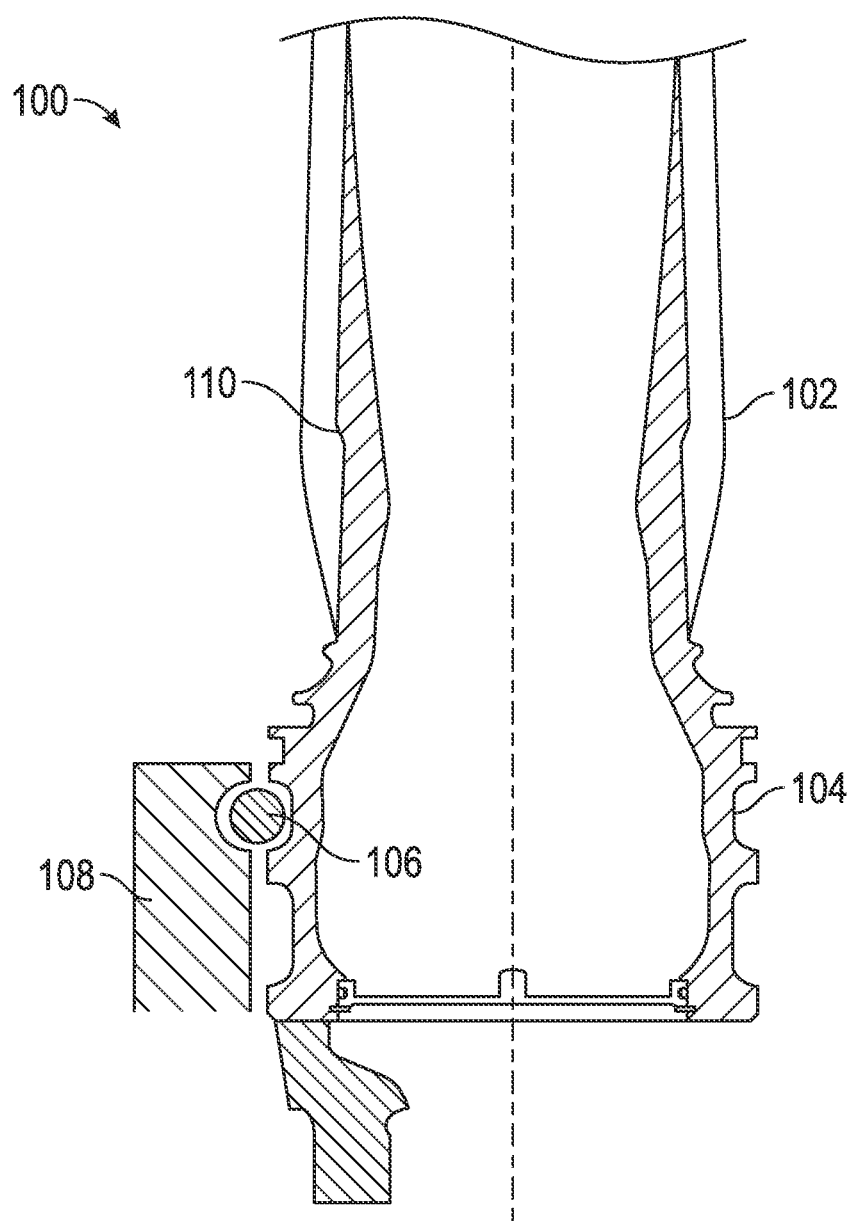
FIG. 11 is a cross-sectional view of a prior propeller blade assembly.

Referring now to FIG. 9, the expansion tool 52 is removed and the inboard inner ring 66 is installed in the spar cavity 50, followed by the inboard wedge 36. Referring to FIG. 10, bolts 54 or other means are used to draw the outboard wedge 34 and inboard wedge 36 together, which expands the outboard inner ring 64 and inboard inner ring 66, which in turn compresses the spar 18 and adhesive into contact with the outer sleeve 20 at the convex sleeve portion 60/concave spar portion 62 interface. The propeller blade 12 is then injected with resin and cured to achieve the selected shape. The outboard inner ring 64 and inboard inner ring 66, the outboard wedge 34 and the inboard wedge 36 prevent collapse of the spar 18 when the CL and BM are applied to the propeller blade 12.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A propeller blade assembly comprising:
   a spar extending along a propeller blade axis;
   an outer sleeve surrounding the spar portion at a root end of the rotor blade assembly, the spar adhesively bonded to the outer sleeve at an interface portion, a spar maximum diameter along the interface portion larger than an outer sleeve minimum diameter along the interface portion;
   an inner ring disposed in a spar cavity, the inner ring including:
     an inboard inner ring; and
     an outboard inner ring, the inboard inner ring and the outboard inner ring defining a ring split line transverse to the propeller blade axis; and
   a wedge disposed inside of the inner ring, installation of the wedge urging the inner ring into contact with the spar, thus urging the spar into conformal compressive contact with the outer sleeve at the interface portion.

2. The propeller blade assembly of claim 1, wherein the inner ring is segmented.

3. The propeller blade assembly of claim 1, wherein the wedge is an inboard wedge and an outboard wedge, relative to the propeller blade axis, the inboard wedge secured to the outboard wedge via one or more bolts.

4. The propeller blade assembly of claim 1 wherein an outer surface of the outer sleeve is configured to interface with one or more bearing rows.

5. The propeller blade assembly of claim 1, wherein the interface portion is defined by a convex surface of the spar and a complimentary concave surface of the outer sleeve.

6. The propeller blade assembly of claim 1, wherein the interface portion is defined by a concave surface of the spar and a complimentary convex surface of the outer sleeve.

7. The propeller blade assembly of claim 1, wherein the spar is formed from a composite material and the outer sleeve is formed from a metal material.

8. A method of assembling a propeller blade comprising:
   installing an outer sleeve over a spar at a root end of the spar, the spar a not fully cured composite component;
   installing an inner ring in a spar cavity, the inner ring including:
     an inboard inner ring; and
     an outboard inner ring, the inboard inner ring and the outboard inner ring defining a ring split line transverse to a propeller blade axis;
   urging the spar into compressive conformance with the outer sleeve at an interface portion of the propeller blade assembly via a wedge installed inside of the inner ring, a spar maximum diameter along the interface portion larger than an outer sleeve minimum diameter along the interface portion; and
   curing the spar thereby adhesively bonding the spar to the outer sleeve at the interface portion.

9. The method of claim 8, wherein installation of the wedge results in expansion of the inner ring into contact with the spar.

10. The method of claim 8, wherein the wedge is an inboard wedge and an outboard wedge, relative to the propeller blade axis, the inboard wedge is tightened to the outboard wedge via one or more bolts;

wherein the tightening of the inboard wedge to the outboard wedge urges the inner ring into contact with the spar.

11. The method of claim 8, further comprising preforming the interface portion of the spar prior to installing the outer sleeve over the spar.

12. The method of claim 8, wherein the interface portion is defined by a convex surface of the spar and a complimentary concave surface of the outer sleeve.

13. The method of claim 8, wherein the interface portion is defined by a concave surface of the spar and a complimentary convex surface of the outer sleeve.

* * * * *